United States Patent
Wood (10) Patent No.: US 7,324,276 B2
(45) Date of Patent: Jan. 29, 2008

(54) FRONT PROJECTION SCREENS INCLUDING REFLECTING AND REFRACTIVE LAYERS OF DIFFERING SPATIAL FREQUENCIES

(75) Inventor: Robert L. Wood, Apex, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 330 days.

(21) Appl. No.: 11/179,162

(22) Filed: Jul. 12, 2005

(65) Prior Publication Data

US 2007/0014004 A1  Jan. 18, 2007

(51) Int. Cl.
  *G03B 21/56*  (2006.01)
  *G03B 21/60*  (2006.01)
(52) U.S. Cl. .......... 359/449; 359/455; 359/459
(58) Field of Classification Search ........ 359/443, 359/449, 452, 454–455, 459
  See application file for complete search history.

(56) References Cited

U.S. PATENT DOCUMENTS

| | | | |
|---|---|---|---|
| 1,985,460 A | 12/1934 | Raven | |
| 2,480,032 A | 8/1949 | Kellogg | |
| 2,968,219 A | 1/1961 | Saiia | |
| 3,263,561 A | 8/1966 | Jackson | |
| 3,314,742 A | 4/1967 | Morgan | |
| 3,492,060 A | 1/1970 | Sherwood | |
| 3,510,197 A | 5/1970 | Seki et al. | |
| 3,598,470 A | 8/1971 | Vetter | |
| 3,653,740 A | 4/1972 | Ogura et al. | |
| 3,964,822 A * | 6/1976 | Yamashita | 359/443 |
| 4,006,965 A | 2/1977 | Takada et al. | |
| 4,025,160 A | 5/1977 | Martinez | |
| 4,040,717 A | 8/1977 | Cinque et al. | |
| 4,089,587 A | 5/1978 | Schudel | |
| 4,190,320 A | 2/1980 | Ferro | |
| 4,201,449 A | 5/1980 | Campion et al. | |
| 4,232,939 A * | 11/1980 | Kikuchi | 359/459 |
| 4,792,209 A | 12/1988 | Laine et al. | |
| 5,148,309 A | 9/1992 | Yamada et al. | |
| 5,361,163 A | 11/1994 | Matsuda et al. | |
| 5,456,967 A | 10/1995 | Nezu | |
| 5,780,140 A | 7/1998 | Nilsen | |
| 5,914,825 A * | 6/1999 | Nishio et al. | 359/851 |
| 6,040,941 A | 3/2000 | Miwa et al. | |
| 6,144,491 A | 11/2000 | Orikasa et al. | |
| 6,163,402 A | 12/2000 | Chou et al. | |
| 6,233,095 B1 | 5/2001 | Niwa et al. | |
| 6,724,529 B2 | 4/2004 | Sinkoff | |
| 6,858,316 B2 * | 2/2005 | Kubota et al. | 428/500 |
| 2005/0058947 A1 | 3/2005 | Rinehart et al. | |
| 2005/0058948 A1 | 3/2005 | Freese et al. | |
| 2005/0058949 A1 | 3/2005 | Wood et al. | |

* cited by examiner

*Primary Examiner*—Diane I. Lee
*Assistant Examiner*—Magda Cruz
(74) *Attorney, Agent, or Firm*—Myers Bigel Sibley & Sajovec, P.A.

(57) ABSTRACT

Projection screens include a substrate, a reflective layer on the substrate and a refractive layer on the substrate. The reflective layer includes reflective microstructures of about 5 µm to about 500 µm in size, and arranged in a first pattern to reflect light at a first spatial frequency. The refractive layer includes refractive microstructures of about 5 µm to about 500 µm in size, and arranged in a second pattern that is different from the first pattern, to refract light at a second spatial frequency that is different than the first spatial frequency. Related fabrication methods also are described.

26 Claims, 5 Drawing Sheets

FRONT PROJECTION SCREENS INCLUDING REFLECTING AND REFRACTIVE LAYERS OF DIFFERING SPATIAL FREQUENCIES

FIELD OF THE INVENTION

This invention relates to optical structures and fabrication methods therefor, and more specifically to front projection screens and fabrication methods therefor.

BACKGROUND OF THE INVENTION

Front projection screens, also referred to as reflective- or reflection-type projection screens, are widely used in cinemas, home theaters and other consumer and commercial applications, wherein a projector is on the same side of the projection screen as the viewer(s).

In designing a front projection screen, it may be desirable to provide high brightness, an acceptable viewing angle (light distribution), color rendition and/or contrast. Many screen designs have been developed that can improve projected image quality over a simple "white wall".

Front projection screens that are used in cinema or home theater applications generally are viewed in dark or subdued lighting conditions. Accordingly, many commercially available screens may lack an ability to effectively reduce or eliminate ambient light reflection that produces loss of contrast and causes the image to wash out in brightly lit settings. One approach to improve the effective contrast of a front projection screen is to increase its gain, or on-axis brightness. High gain can provide a larger ratio of reflected image light to reflected ambient light in a given setting. This may perceived by the viewer in a number of ways, including brighter whites, deeper blacks, more pleasing color saturation, improved edge definition and/or improved picture detail.

Unfortunately, high gain screens may reduce the viewing angle of the screen. Stated differently, high on-axis brightness may be achieved through reduction and brightness at other angles. Thus, for a given projector with a given lumen output, a high gain screen may have a smaller field of view than a low gain screen. In order to allow a relatively wide field of view, many commercial projection screens offer only a modest increase in gain over a white wall.

U.S. Pat. No. 6,724,529 to Sinkoff, entitled "*Reflection-Type Projection Screens*", describes a projection screen comprising; a substrate having a generally flat forward surface; a diffusion layer formed of a plurality of generally equally spaced apart concave features forming micro lenses; a layer of reflective material deposited on a rearward facing surface of the diffusion layer; the diffusion layer laminated to the forward facing surface of the substrate so that the layer of reflective material is sandwiched therebetween. See the abstract of U.S. Pat. No. 6,724,529.

SUMMARY OF THE INVENTION

Projection screens according to exemplary embodiments of the present invention include a substrate, a reflective layer on the substrate and a refractive layer on the substrate. The reflective layer comprises reflective microstructures of about 0.5 μm to about 500 μm in size, and arranged in a first pattern to reflect light at a first spatial frequency. The refractive layer comprises refractive microstructures of about 0.5 μm to about 500 μm in size, and arranged in a second pattern that is different from the first pattern, to refract light at a second spatial frequency that is different than the first spatial frequency.

As is well known to those having skill in the art, spatial frequency refers to the inverse of the periodicity with which the image intensity values change. Small objects generate high spatial frequencies while large objects generate low spatial frequencies. As used herein, reflecting or refracting light at a given spatial frequency includes frequencies below and up to the given spatial frequency, but not above the given spatial frequency. Moreover, the first and second different patterns can differ in size, shape and/or any other characteristic of the elements of the pattern.

In some embodiments, the reflective microstructures are between about 1 μm and about 100 μm in size, and the refractive microstructures are between about 1 μm and about 100 μm in size. Moreover, in some embodiments, the first and second patterns are randomly and/or regularly arranged.

In some embodiments, the projection screen has a front and a back, and the reflective layer and the refractive layer are arranged on the substrate, such that light that is projected to the front of the projection screen passes through and is refracted by the refractive layer, to impinge on the reflective layer, and is reflected from the reflective layer back through the refractive layer to emerge from the front of the projection screen. In still other embodiments, the projection screen has a vertical axis and a horizontal axis, and the reflective layer and/or the refractive layer are configured to produce a vertical half angle of the light that emerges from the front of the projection screen that is less than a horizontal half angle of the light that emerges from the front of the projection screen. As is well known to those having skill in the art, half angle denotes the angle from normal to the screen at which the light intensity reaches half of its on-axis intensity. Twice the half angle also may be referred to as a Full Width at Half Maximum (FWHM) angle.

In still other embodiments of the present invention, the first pattern comprises a plurality of grooves that extend along the vertical axis, and the refractive microstructures comprise a plurality of anamorphic microlenses having a vertical half angle that is less than a horizontal half angle thereof. As is well known to those having skill in the art, an anamorphic lens is a non-rotationally symmetric lens that may result in broader divergence in one direction than in another direction. Moreover, in other embodiments, the anamorphic microlenses are on the first face and the plurality of grooves are between the refractive layer and the first face.

In still other embodiments of the invention, the first pattern comprises a texture pattern, and the refractive microstructures comprise an array of anamorphic microlenses. In some of these embodiments, the substrate includes first and second opposing faces, the refractive layer is on the first face, and the reflective layer is between the refractive layer and the first face. In other embodiments, the refractive layer is on the first face and the reflective layer is on the second face.

In still other embodiments, the first pattern comprises a plurality of anamorphic reflectors having a vertical half angle that is less than a horizontal half angle thereof, and the refractive microstructures comprise a plurality of anamorphic microlenses having a vertical half angle that is less than a horizontal half angle thereof. In still other embodiments, the plurality of anamorphic microlenses are on the first face, and the plurality of anamorphic reflectors are on the second face. In still in other embodiments, one of the reflective layer or the refractive layer is configured to preferentially reflect or refract light along the horizontal axis, compared to the vertical axis. The other of the reflective layer or the refractive layer is configured to preferentially reflect or refract light along the vertical axis compared to the horizontal axis.

In still other embodiments, the refractive layer is a first refractive layer, and the projection screen further comprises a second refractive layer on the substrate. The second refractive layer comprises refractive microstructures of about 0.5 µm to about 500 µm in size, and arranged in the first pattern. In these embodiments, the reflective layer extends conformally on the second refractive layer. Moreover, in some embodiments, the first refractive layer is on the first face of the substrate, the second refractive layer is on the second face of the substrate, and the reflective layer is on the second refractive layer opposite the second face.

Projection screens according to other exemplary embodiments of the present invention comprise a substrate including a reflective metal face having a textured surface, to provide reflective microstructures of about 0.5 µm to about 500 µm in size, and arranged in a first pattern to reflect light at a first spatial frequency. An array of refractive microstructures of about 0.5 µm to about 500 µm in size is provided on the textured surface and arranged in a second pattern that is different from the first pattern, to refract light at a second spatial frequency that is different from the first spatial frequency. In some embodiments, the first pattern comprises a plurality of grooves that extend along the vertical axis and the refractive microstructures comprise a plurality of anamorphic microlenses having a vertical half angle that is less than a horizontal half angle thereof.

Projection screens according to yet other exemplary embodiments of the present invention comprise a transparent substrate having front and back faces. A first array of refractive microstructures of about 0.5 µm to about 500 µm in size is provided on the front face and arranged in a first pattern to refract light at a first spatial frequency. A second array of refractive microstructures of about 0.5 µm to about 500 µm in size is provided on the back face and arranged in a second pattern that is different from the first pattern, to refract light at a second spatial frequency that is different than the first spatial frequency. A reflective layer also is provided that extends conformally on the second array of refractive microstructures, to provide an array of reflective microstructures of about 0.5 µm to about 500 µm in size on the back face, and arranged in the second pattern to reflect light at the second spatial frequency. In some of these embodiments, the first and second arrays of refractive microstructures comprise respective first and second arrays of anamorphic microlenses having vertical half angles that are less than horizontal half angles thereof.

Projection screens may be fabricated, according to exemplary embodiments of the invention, by texturing a surface of a reflective metal substrate and arranging a mold of microlenses adjacent the surface that was textured, with liquid polymer between the mold and the surface that was textured, to thereby mold the microlenses in the liquid polymer. The liquid polymer is then photocured and the mold is removed. In some embodiments, the above-described molding may take place by placing the mold adjacent the surface that was textured and injecting the liquid photopolymer between the mold and the surface that was textured. In other embodiments, this molding may take place by placing the liquid photopolymer on the surface that was textured and placing the mold on the liquid photopolymer.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled"to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. In particular, as used herein, the relative terms "first direction" and "second direction" mean two different, not necessarily orthogonal, directions, whereas the terms "horizontal" and "vertical" indicate specific orientations based upon the ultimate orientation of the projection screen. Moreover, the terms "front" and "back" are used herein to describe opposing outward faces of a front projection screen. Conventionally, the viewing face is deemed the front, but the viewing face may also be deemed the back, depending on orientation. Finally, the terms "viewing angle," "field of view," "half angle" and "FWHM" are used interchangeably herein to denote a range of acceptable viewing positions that are offset from normal to the screen.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1A:
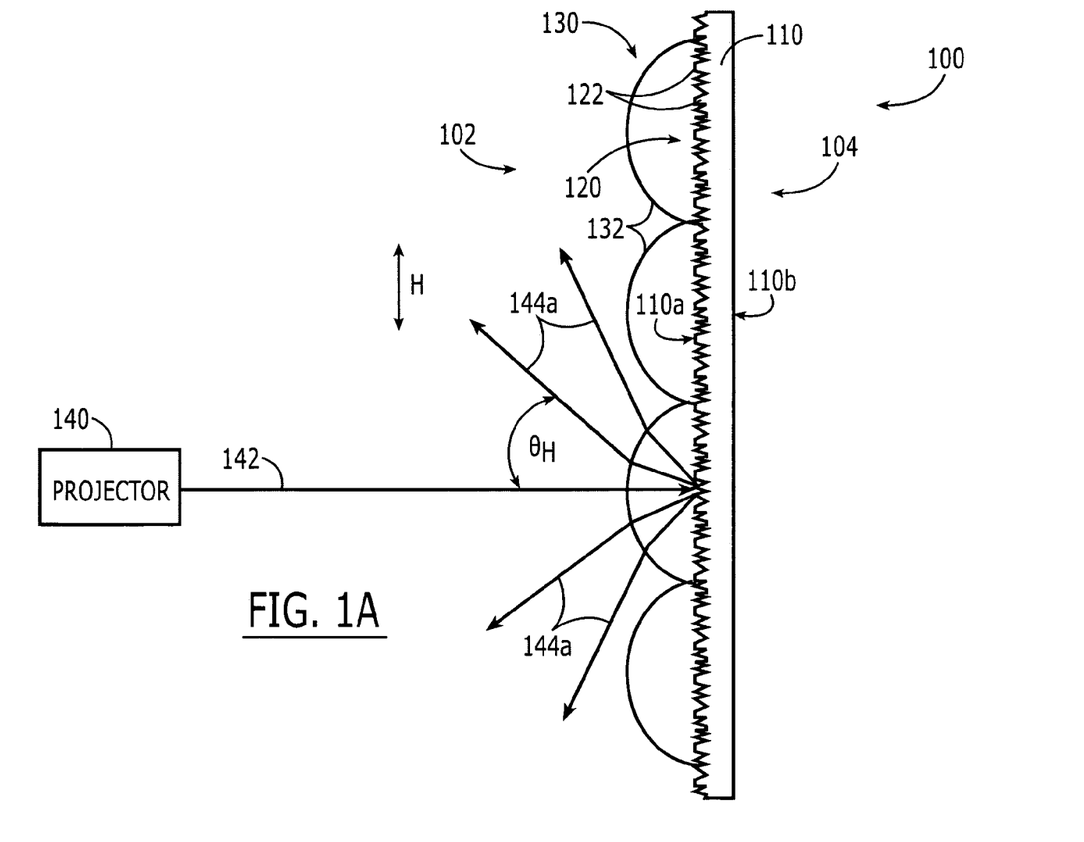
FIG. 1A is a cross-sectional view of a front projection screen according to exemplary embodiments of the present invention viewed from the top of screen.
Figure 1B:
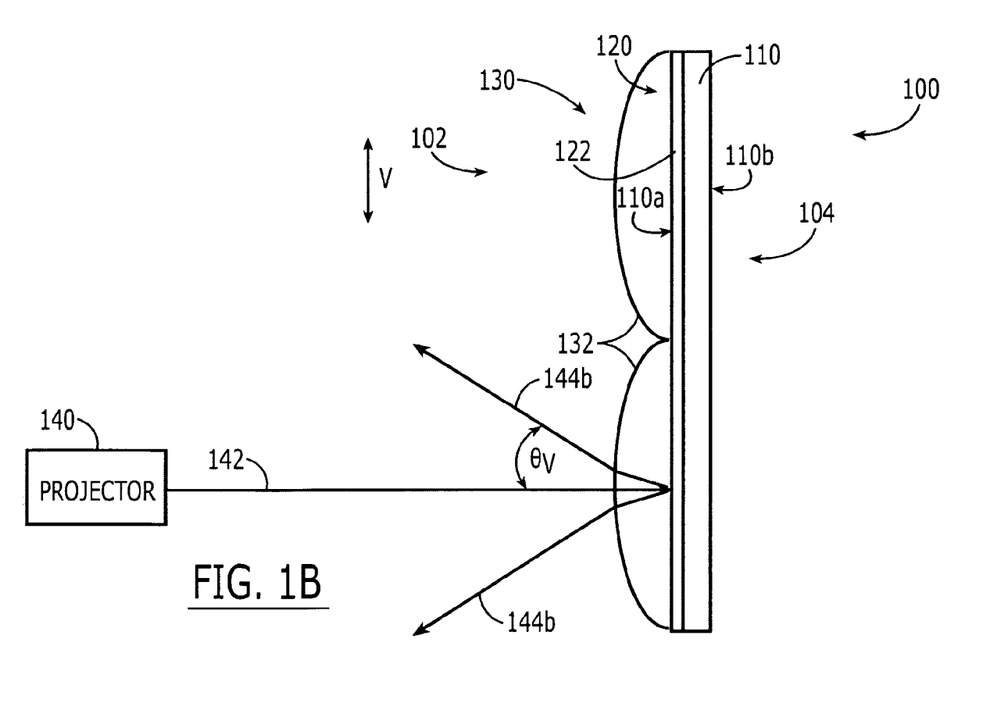
FIG. 1B is a cross-sectional view of a front projection screen of FIG. 1A viewed from a side of the screen.

FIGS. 1A and 1B are cross-sectional views of a projection screen according to exemplary embodiments of the present invention, when viewed from the top of the screen and when viewed from a side of the screen, respectively. Thus, FIG. 1A illustrates a cross-section of a projection screen 100 extending along a horizontal axis H, whereas FIG. 1B illustrates a cross-sectional view along the vertical axis V.

Referring to FIGS. 1A and 1B, these embodiments of projection screens 100 include a front or front face 102 and a back or back face 104, wherein the front face 102 is defined as the face that is adjacent (i.e., faces) a projector 140 and a viewer.

Still referring to FIGS. 1A and 1B, the projection screen 100 includes a substrate 110 and a reflective layer 120 on the substrate 110. The reflective layer 120 comprises reflective microstructures 122 of about 0.5 µm to about 500 µm in size, and arranged in a first pattern, to reflect light at a first spatial frequency. It will be understood by those having skill in the art, that the reflective microstructures 122 of about 0.5 µm to about 500 µm refers to the size of the reflective microstructures 122 along at least a first direction of the screen, such as the horizontal direction in FIG. 1A. The reflective microstructures may be larger or smaller along at least a second direction of the screen, such as the vertical direction of FIG. 1B. In FIG. 1A, the reflective layer 120 comprises a texture pattern, for example a plurality of grooves that extend along the vertical axis of FIG. 1B. However, other patterns of textured reflective layers also may be provided.

Still referring to FIGS. 1A and 1B, a refractive layer 130 also is provided on the substrate 110. The refractive layer comprises refractive microstructures 132, such as microlenses of about 0.5 µm to about 500 µm in size, and arranged in a second pattern that is different from the first pattern, to refract light at a second spatial frequency that is different from the first spatial frequency. It will be understood that the refractive microstructures 132 of about 0.5 µm to about 500 µm refers to the size of the refractive microstructures along at least a first direction of the screen, such as the horizontal direction shown in FIG. 1A. The refractive layer 130 may be larger or smaller in size along a second direction, such as along a vertical direction, for example when lenticular lenses are used.

In other embodiments, the reflective microstructures are between about 1 µm and about 100 µm in size, and the refractive microstructures are between about 1 µm and about 100 µm in size. Moreover, the first and second patterns may be randomly and/or periodically arranged.

In some embodiments of the present invention, the refractive layer 130 comprises an array of anamorphic lenses 132, as illustrated in FIGS. 1A and 1B. Moreover, in FIGS. 1A and 1B, the spatial frequency of the reflective layer 120 is higher than the spatial frequency of the refractive layer 130. In other embodiments, however, this relationship may be reversed, as long as the first and second spatial frequencies are different from one another.

Still referring to FIGS. 1A and 1B, the reflective layer 120 and the refractive layer 130 are arranged on the substrate 110, such that light 142 that is projected to the front 102 of the projection screen 100 passes through and is refracted by the refractive layer 130, to impinge on the reflective layer 120 and is reflected from the reflective layer 120 back through the refractive layer 130 to emerge from the front of the projection screen 102. This refraction, reflection and refraction is shown by the light rays 144a, 144b that emerge from the front 102 of the projection screen 100.

Moreover, as also shown in FIGS. 1A and 1B, the projection screen has a vertical axis V (FIG. 1B) and a horizontal axis H (FIG. 1A). The reflective layer 120 and/or the refractive layer 130 are configured to produce a vertical half angle $\theta_v$ of the light 144b that emerges from the front 102 of the projection screen 100 that is less than a horizontal half angle $\theta_H$ of the light 144a that emerges from the front 102 of the projection screen 110. This difference between the vertical half angle $\theta_v$ and the horizontal half angle $\theta_H$ is illustrated in FIGS. 1A and 1B by the larger horizontal half angle $\theta_H$ and light rays 144a of FIG. 1A, compared to the smaller vertical half angle $\theta_v$ and light rays 144b of FIG. 1B.

In FIGS. 1A and 1B, the vertically extending grooves 122 that comprise the reflective layer 120 and the anamorphic lenses that comprise the refractive layer 130, both can contribute to provide a smaller vertical half angle $\theta_v$ than the horizontal half angle $\theta_H$. However, in other embodiments of the invention, uneven light distribution may be provided in opposite or different directions by the reflective layer 120 and the refractive layer 130, to provide a desired net light distribution. Thus, for example, in some embodiments of the invention, the grooves may extend along the horizontal axis and/or the anamorphic lenses may provide a larger vertical half angle than a horizontal half angle. Stated differently, in some embodiments, as shown in FIGS. 1A and 1B, both the reflective layer 120 and the refractive layer 130 are configured to preferentially reflect or refract light along the horizontal axis compared to the vertical axis. However, in other embodiments, one of the reflective layer 120 or the refractive layer 130 is configured to preferentially reflect or refract light along the horizontal axis compared to the vertical axis, and the other of the reflective layer 120 or the refractive layer 130 is configured to preferentially refract light along the vertical axis compared to the horizontal axis.

It also will be understood that, in FIGS. 1A and 1B, the substrate 110 includes first 110a and second 110b opposing faces corresponding to the front 102 and back 104 of the screen 100. In embodiments of FIGS. 1A and 1B, the refractive layer 130 is on the first face 110a, and the reflective layer 120 is between the refractive layer 130 and the first face 110a. However, in other embodiments of the invention, the substrate 110 may be transparent and the refractive layer 130 may be on the first face 110a, as shown in FIGS. 1A and 1B, but the reflective layer 120 can be on the second face 110b corresponding to the back 104 of the screen 100.

FIGS. 1A and 1B also illustrate specific embodiments of the present invention, wherein the projection screen 100 includes a substrate 110 including a reflective metal face 110a having a textured surface 120, to provide reflective microstructures 122 of about 0.5 µm to about 500 µm in size, and arranged in a first pattern to reflect light at a first spatial frequency. An array 130 of refractive microstructures 132 of about 0.5 µm to about 500 µm in size is provided on the textured surface 120 and arranged in a second pattern that is different from the first pattern to refract light at a second spatial frequency that is different from the first spatial frequency. FIGS. 1A and 1B also illustrate embodiments of the invention wherein the projection screen has a vertical axis (FIG. 1B) and a horizontal axis (FIG. 1A), and wherein the first pattern 120 comprises a plurality of grooves 122 that extend along the vertical axis (FIG. 1B), and wherein the refractive microstructures 132 comprise a plurality of anamorphic microlenses having a vertical half angle $\theta_v$ that is less than a horizontal half angle $\theta_H$ thereof.

Figure 2A:
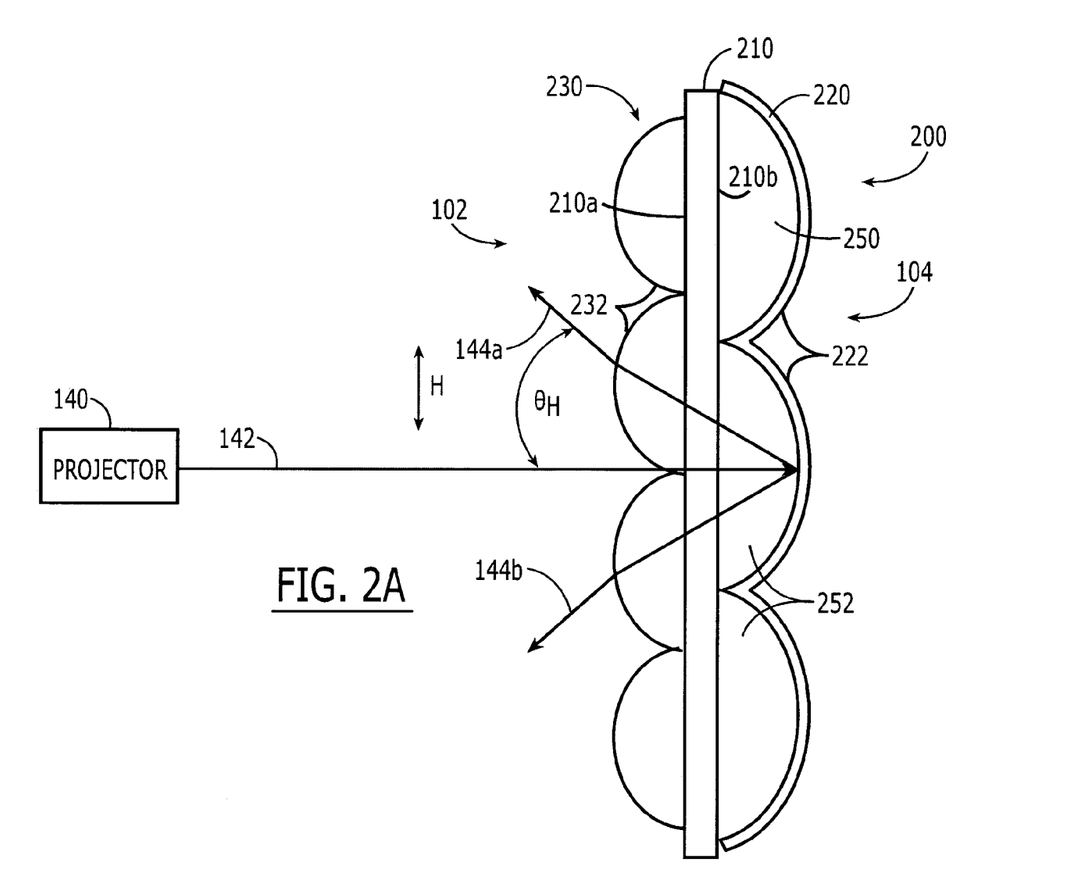
FIG. 2A is a cross-sectional view of a front projection screen according to other exemplary embodiments of the present invention viewed from the top of screen.
Figure 2B:
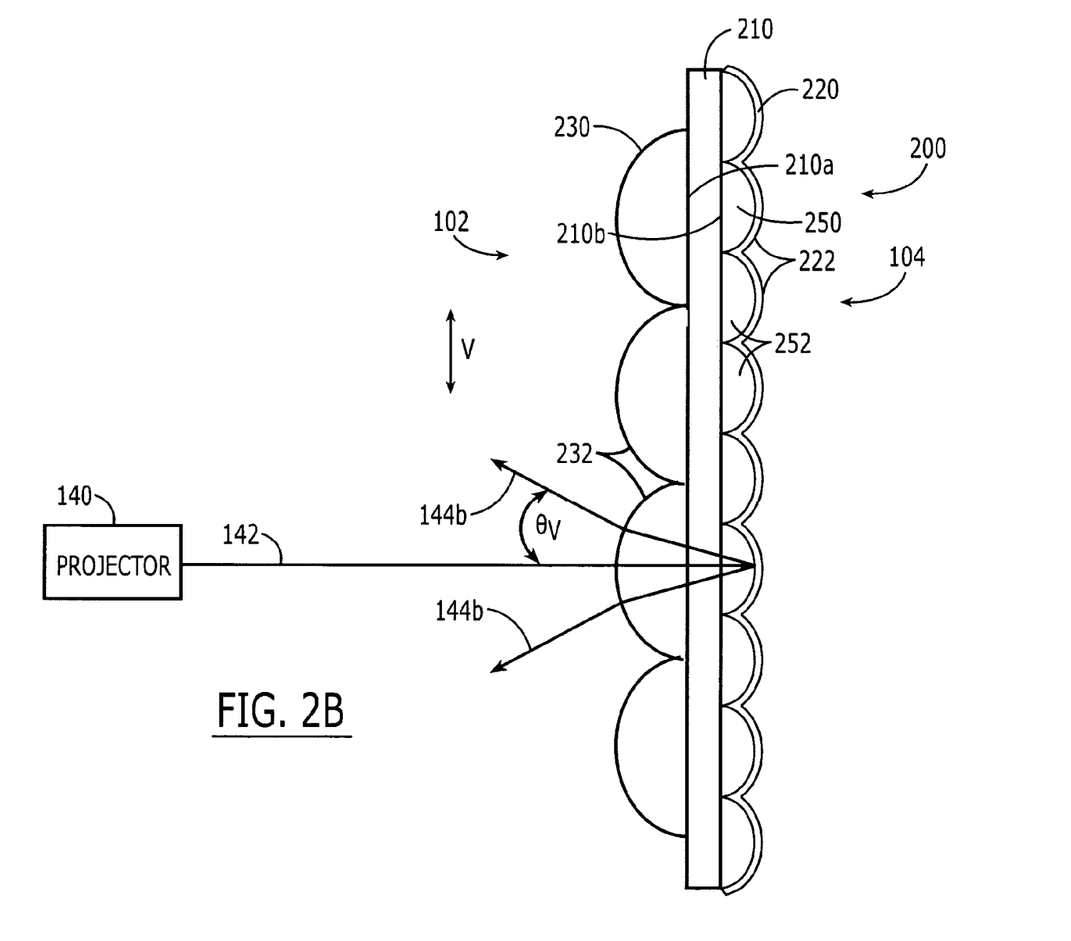
FIG. 2B is a cross-sectional view of a front projection screen of FIG. 2A viewed from a side of the screen.

FIGS. 2A and 2B are cross-sections of projection screens according to other embodiments of the present invention, viewed from the top of the screen and from a side of the screen, respectively. As shown in FIGS. 2A and 2B, these projection screens 200 include a transparent substrate 210. As used herein, the term "transparent" means that at least some of the light entering the substrate emerges from the substrate.

In embodiments of FIGS. 2A and 2B, the reflective layer 220 is on the second (back) face 210b of the substrate 210, and the refractive layer 230 is on the front face 210a of the substrate 210. Moreover, in embodiments of FIGS. 2A and 2B, the reflective layer 220 comprises a plurality of anamorphic reflectors 222 having a vertical half angle that is less than a horizontal half angle thereof, and the refractive microstructures 230 comprise a plurality of anamorphic microlenses 232 having a vertical half angle that is less than a horizontal half angle thereof. Also, in embodiments of FIGS. 2A and 2B, the refractive layer 230 is a first refractive layer, and the projection screen 200 further comprises a second refractive layer 250 on the substrate 210. The second refractive layer 250 comprises refractive microstructures 252 of about 0.5 µm to about 500 µm in size arranged in the first pattern. The reflective layer 220 extends conformally on the second refractive layer 250. As also shown in FIGS. 2A and 2B, the substrate includes first and second opposing faces 210a and 210b, respectively, the first refractive layer 230 is on the first face 210a, the second refractive layer 250 is on the second face 210b, and the reflective layer 220 is on the second refractive layer 250 opposite the second face 210b.

Accordingly, FIGS. 2A and 2B illustrate projection screens according to other embodiments of the present invention which comprise a transparent substrate 210 having front and back faces 210a and 210b, respectively. A first array 230 of refractive microstructures 232 of about 0.5 µm to about 500 µm in size is provided on the front face 210a, and arranged in a first pattern to refract light at a first spatial frequency. A second array 250 of refractive microstructures 252 of about 0.5 µm to about 500 µm in size is provided on the back face 210b and arranged in a second pattern that is different from the first pattern to refract light at a second spatial frequency that is different from the first spatial frequency. A reflective layer 220 extends conformally on the second array of refractive microstructures 252, to provide an array of reflective microstructures 222 of about 0.5 µm to about 500 µm in size on the back face 210b and arranged in the second pattern to reflect light at the second spatial frequency. Moreover, FIGS. 2A and 2B illustrate that the first 230 and second 250 arrays of refractive microstructures can comprise respective first and second arrays of anamorphic microlenses having vertical half angles that are less than horizontal half angles thereof.

It also will be understood by those having skill in the art that embodiments of FIGS. 1A, 1B, 2A and/or 2B may be combined in various combinations and subcombinations.

Additional discussion of various embodiments of the present invention now will be provided. In particular, as was described above, there may be a tradeoff between brightness and field of view for a projection screen. Higher on-axis brightness may be achieved by reduction in brightness at other angles. Thus, for a given projector 140 with a given lumen output 142, a high gain screen may have a smaller field of view (half angle) than a low gain screen. Some embodiments of the present invention can at least partially overcome this potential tradeoff by a screen construction that can limit only the vertical angle of view, but not the horizontal angle of view.

Since viewers typically do not view the screen from large angles above or below the screen, light distributed into large vertical angles may be wasted. Accordingly, some embodiments of the invention can effectively harvest light that would otherwise be wasted in high vertical angles, and redirect this light into viewing angles that are generally used. Projection screens according to some embodiments of the present invention can, therefore, provide both high gain and high effective viewing angle, and can thereby appear to be much brighter than a white wall, but without perceptible loss of horizontal viewing angle, and with only modest loss of vertical viewing angle.

Some embodiments of the present invention can provide an array 130, 230 of refractive microstructures 132, 232. The refractive microstructures 132, 232 may be embodied as a microtextured light-diffusing surface made of a transparent material. An array 120, 220 of reflective microstructures 122, 222 also may be provided that, in some embodiments, comprises a metallic reflective material having a light directing microtexture on its outer surface. The array 130, 230 of refractive microstructures 132, 232 can be designed to cause diffusion of light 142 as it arrives from the projector 140 onto the screen surface, and then again as light reflects from the array 120, 122 of reflective microstructures 122, 222 back toward the viewer.

Many combinations of reflective and refractive microstructures may be provided, according to various embodiments of the present invention, as long as the reflective and refractive microstructures are of different spatial frequencies. Thus, the refractive microstructures 132, 232 can include shapes that are designed to refract light into a desired range of angles. For example, the refractive microstructures 132, 232 can comprise anamorphic microlenses having a fast and slow optical axis, so that light is diffused into a larger range of angles in the plane of the fast optical axis (e.g., horizontally), and a smaller range of angles in the plane of the slow optical axis (e.g., vertically). Thus, light may be distributed more broadly in the horizontal direction than the vertical direction. In other embodiments, however, the refractive microstructures 132, 232 need not be lenses, and may or may not form discrete foci.

The array of reflective microstructures 122, 222, which may comprise a metal reflective layer, is designed to effectively reflect light falling on its surface after passing through the refractive microstructures 132, 232. In some embodiments, the array of reflective microstructures 122, 222 may be provided by microtexturing, to produce additional divergence of light as it reflects from the array of reflective microstructures 122, 222. This additional diffusion can act independently of the diffusion that occurs in the refractive microstructures 132, 232. Thus, in some embodiments, the diffusion occurring in the reflective microstructures 122, 132 may be cooperative with the diffusion occurring in the array of refractive microstructures 132, 232. However, in some embodiments, the diffusions may be opposite one another, or some combination thereof. Accordingly, by combining the diffusion patterns of the refractive microstructures 132, 232, and the reflective microstructures 122, 222, a field of view pattern may be produced that is different from that which is provided by either set of microstructures individually. The composite field of view may be governed by a function that corresponds to a square root of the sum of squares of the individual fields of view, and that is independent for each axis (horizontal or vertical) of the projection screen.

Generally, the structural elements that comprise the reflective microstructures 122, 222 and the refractive microstructures 132, 232 may have discrete sizes ranging from about 0.5 µm to about 500 µm and, in some embodiments, from about 1 µm to about 100 µm m. In some embodiments, the refractive microstructures 132, 232 may be in the form of concave or convex microlenses of various size and shape combinations, or may be prism-like structures or multifaceted sections of various polyhedra, cylinders and/or aspheres, and combinations and subcombinations of these shapes. The shapes may be random or regular across the surface of the screen, and light distribution characteristics of such microstructures may vary in a random or regular manner across the surface of the screen. In addition to light distribution properties described above, the refractive microstructures 132, 232 may also provide an anti-glare characteristic to the screen due to the suppression or elimination of specular reflection, which can suppress or eliminate the effect of ambient light reflection. In some embodiments, the microtexturing of the refractive microstructures 132, 232 may be specifically selected to produce strong diffusion of light in a horizontal direction (FIGS. 1A and 2A), and weak diffusion of light in a vertical direction (FIGS. 1B and 2B). Moreover, in some embodiments, microtexturing shapes in the refractive microstructures 132, 232 may also be selected to cause asymmetric reflection along the vertical direction to allow for off-axis projector placement.

The reflective microstructures 122, 222 may have the same or similar forms as the array of refractive microstructures 132, 232, but of different spatial frequencies as was described above. Moreover, the reflective microstructures may also be in the form of grooves, ridges, cross-hatching and the like. The array of reflective microstructures 122, 222 may be of random, regular or quasi-periodic shape across the surface of the screen, and light distribution characteristics of the reflective microstructures may vary in a random or regular manner across the surface of the screen. In some embodiments, the microtexturing of the reflective microstructures 122, 222 may be specifically selected to produce strong diffusion of light in the horizontal direction, with little or no diffusion of light in the vertical direction.

As was already described, the array of reflective microstructures 122, 222 and the array of refractive microstructures 132, 232 are of different spatial frequencies. The different spatial frequencies may be provided by dissimilar sizes, shapes, periodicities, and/or by providing a periodic and/or quasi-periodic reflective and refractive microstructures. By providing different spatial frequencies, visible moiré or aliasing artifacts can be reduced or eliminated.

Fabrication methods for projection screens according to various embodiments of the present invention now will be described with reference to FIGS. 3A and 3B. The following discussion will focus on embodiments of FIGS. 1A and 1B. However, similar techniques may be used to fabricate embodiments of FIGS. 2A and 2B, or combinations and subcombinations of these embodiments.

Figures 3A, 3B:
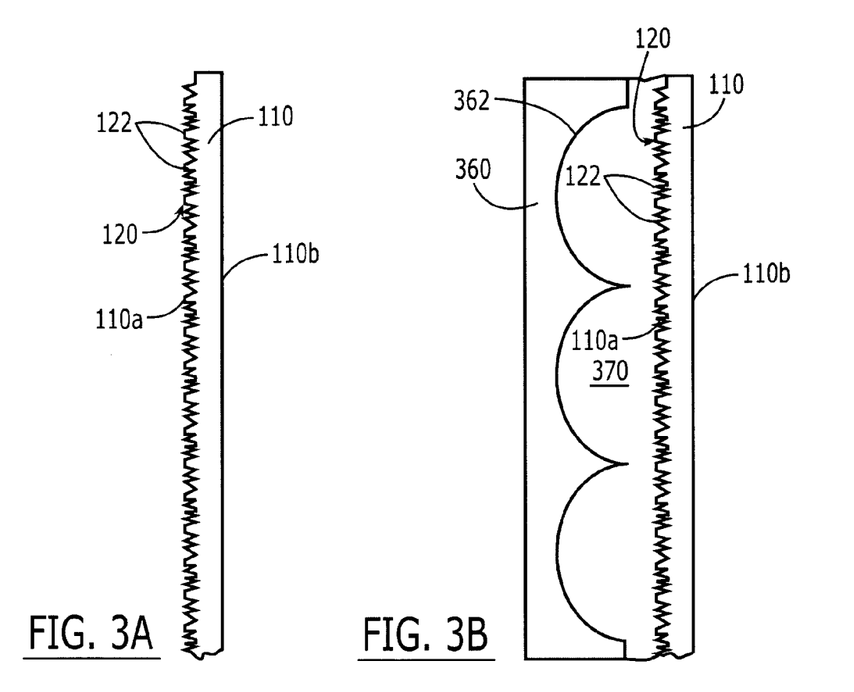
FIGS. 3A and 3B are cross-sectional views of screens of FIGS. 1A and 1B during intermediate fabrication steps according to exemplary embodiments of the present invention.

Referring to FIG. 3A, a surface 110a of a reflective metal substrate 110 is textured, to provide the array of reflective microstructures 122. The texturing may be performed in a variety of ways, including mechanical techniques such as abrasion, brushing, chemical-mechanical polishing, sandblasting or the like; and/or by chemical techniques, such as etching, anodizing and/or plating. In other embodiments, such as was shown in FIGS. 2A-2B, metallization of a preformed microstructure produced, for example, by microreplication, may be used to provide a conformal metal layer 220 on a microstructure array 250. Combinations and subcombinations of these techniques also may be used. The metal may be a highly reflective metal, such as aluminum, silver, chromium and/or other conventional reflective metals. In some embodiments, aluminum may be used, and may be textured by an abrasive graining process, such as brush finishing, as described, for example, in U.S. Pat. No. 3,964,822 to Yamashita, entitled "*Projection Screen and Process for Production Thereof*", the disclosure of which is hereby incorporated herein by reference in its entirety as if set forth fully herein.

Referring now to FIG. 3B, a mold 360 of microlenses 362 (or, more particularly, an inverse of the microlenses) is arranged adjacent the surface 110a that was textured, with liquid photopolymer 370 between the mold 360 and the surface 110a that was textured, to thereby mold the microlenses 362 in the liquid photopolymer 370. The liquid photopolymer 370 is then photocured, and the mold 360 is removed. It will be understood that only partial curing of the liquid photopolymer may take place by photoexposure and remaining curing may take place using other techniques, such as heating.

In some embodiments, the mold 360 is placed adjacent the surface 110a that was textured, and the liquid photopolymer 370 is then injected between the mold 360 and the surface 110a that was textured. In other embodiments, the liquid photopolymer 370 is placed on the surface 110a that was textured, and the mold 360 is then placed on the liquid photopolymer 370. The mold 360 may be fabricated, for example, by microreplication of a master containing the desired shapes that make up the microtexture. The mold may be fabricated, for example, as described in Published United States Patent Application Nos. US 2005/0058947 A1 to Rinehart et al., entitled *Systems And Methods for Fabricating Optical Microstructures Using a Cylindrical Platform and a Rastered Radiation Beam*; US 2005/0058948 A1 to Freese et al., entitled *Systems and Methods for Mastering Microstructures Through a Substrate Using Negative Photoresist and Microstructure Masters So Produced*; and/or US 2005/0058949 A1 to Wood et al., entitled *Systems and Methods for Fabricating Microstructures by Imaging a Radiation Sensitive Layer Sandwiched Between Outer Layers, and Microstructures Fabricated Thereby*, all published Mar. 17, 2005, and assigned to the assignee of the present invention, the disclosures of which are hereby incorporated herein by reference in their entirety as if set forth fully herein.

A transparent or semitransparent material, such as the photopolymer 370 may be used. Dyes or colorants may be added to the photopolymer 370 in order to impart a specific color and/or to change the color rendition characteristics of the screen. Diffusive materials also may be added to the photopolymer 370 in order to modify its diffusive properties. A specific hardness property may be chosen for the photopolymer 370, so that the finished screen may have scratch resistant properties. Various conventional bulk and/or surface treatments also may be applied. For example, a conventional staticide may be used to impart anti-static properties to layer.

Figures 4A, 4B:
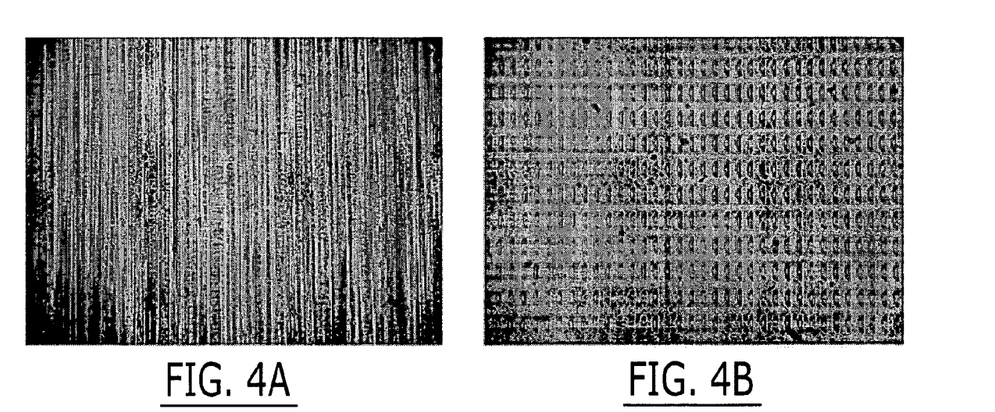
FIGS. 4A and 4B are micrographs of portions of a projection screen according to exemplary embodiments of the present invention.

FIGS. 4A and 4B are micrographs of a portion of a projection screen of FIGS. 1A and 1B that was fabricated as was described in FIGS. 3A and 3B. In particular, FIG. 4A illustrates the texturing of a metal substrate using grooves, as was shown schematically in FIG. 3A. FIG. 4B illustrates the microlenses 362 of FIG. 3B on the grooved metal substrate of FIG. 4A.

EXAMPLE

The following Example shall be regarded as merely illustrative and shall not be construed as limiting the invention.

A front projection screen was constructed from two attached layers. The first layer, corresponding to the substrate 110 and the array of reflective microstructures 122 of FIGS. 1A and 1B, was produced by starting with a 0.001" thick aluminum sheet whose surface was grained in one direction using a brush finishing technique. This produced a surface including random parallel grooves and ridges of about 5 μm in width, with a depth of about 1 μm. See FIG. 4. The textured surface was primed with a transparent primer layer of acrylic primer and dried.

To form the array of refractive microstructures 132, a photopolymer microlens mold 360 was placed in contact with the primed surface, and the space between the mold 360 and the primed aluminum surface 122 was filled with liquid photopolymer 370 by injection. The liquid photopolymer that was used was Sartomer PRO 7590 acrylic photopolymer. Excess photopolymer 370 was squeezed out using a laminator. The laminate was exposed through the transparent mold 360 to ultraviolet light, with a wavelength of about 360 nm and an intensity of about 200-300 watt/inch, to cure the photopolymer 370. The mold 360 was then removed, to leave a replica of the microlenses attached to the primed surface of the aluminum.

In the present Example, the microlenses 132 were chosen to have a very high optical divergence in a horizontal direction and a smaller optical divergence in the vertical direction. In particular, the microlenses 132 were anamorphic microlenses with a horizontal base of 80 μm, a vertical base of 20 μm, and a depth of 40 μm. The grain pattern in the aluminum was oriented such that the grains were parallel to the vertical axis, as shown in FIG. 1B, thus further enhancing horizontal optical divergence of the composite structure. As shown in FIGS. 1A and 1B, light 142 arriving from the projector 140 strikes the array of refractive microstructures 132, and is strongly diverged in a horizontal direction and weakly diverged in a vertical direction towards the array of reflective microstructures 122. Light striking the reflective microstructures 122 is further diverged in the horizontal direction, but not diverged in the vertical direction on reflection due to the surface grain pattern. Light reflected from the reflective microstructures 122 again pass through the refractive microstructures 132 and again is strongly diverged in a horizontal direction and weakly diverged in a vertical direction. The resulting light distribution provides a very wide horizontal field of view and a much smaller vertical field of view. By restricting the vertical field of view, the on-axis gain of the screen can be increased. Specifically, in the present Example, the reflective microstructures have a horizontal half angle of 11° and a vertical half angle of 5°. The refractive microstructures 130 have a horizontal half angle of 22° and a vertical half angle of 17°. The composite screen showed an on-axis gain of 2.4, a horizontal half angle of 35° and a vertical half angle of 15°. In addition, the screen of this Example showed very low glare and good scratch resistance.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A projection screen comprising:

a substrate;

a reflective layer on the substrate, the reflective layer comprising reflective microstructures of about 0.5 μm to about 500 μm in size and arranged in a first pattern to reflect light at a first spatial frequency; and a refractive layer on the substrate, the refractive layer comprising refractive microstructures of about 0.5 μm to about 500 μm in size and arranged in a second pattern that is different from the first pattern to refract light at a second spatial frequency that is different than the first spatial frequency;

wherein the projection screen has a front and a back and wherein the reflective layer and the refractive layer are arranged on the substrate such that light that is projected to the front of the projection screen passes through and is refracted by the refractive layer to impinge on the reflective layer and is reflected from the reflective layer back through the refractive layer to emerge from the front of the projection screen; and wherein the projection screen has a vertical axis and a horizontal axis and wherein the reflective layer and/or the refractive layer are configured to produce a vertical half angle of the light that emerges from the front of the projection screen that is less than a horizontal half angle of the light that emerges from the front of the projection screen.

2. A projection screen according to claim 1 wherein the first pattern comprises a texture pattern and wherein the refractive microstructures comprise an array of anamorphic microlenses.

3. A projection screen according to claim 2 wherein the substrate includes first and second opposing faces, wherein the refractive layer is on the first face and wherein the reflective layer is between the refractive layer and the first face.

4. A projection screen according to claim 2 wherein the substrate includes first and second opposing faces, wherein the refractive layer is on the first face and wherein the reflective layer is on the second face.

5. A projection screen according to claim 1 wherein the reflective microstructures are between about 1 μm and about 100 μm in size and wherein the refractive microstructures are between about 1 μm and about 100 μm in size.

6. A projection screen according to claim 1 wherein the first and second patterns are randomly and/or regularly arranged.

7. A projection screen according to claim 1 wherein the refractive layer is a first refractive layer and wherein the projection screen further comprises a second refractive layer on the substrate, the second refractive layer comprising refractive microstructures of about 0.5 μm to about 500 μm in size arranged in the first pattern, and wherein the reflective layer extends conformally on the second refractive layer.

8. A projection screen according to claim 7 wherein the substrate includes first and second opposing faces, wherein the first refractive layer is on the first face, wherein the second refractive layer is on the second face and wherein the reflective layer is on the second refractive layer opposite the second face.

9. A projection screen comprising:
a substrate;
a reflective layer on the substrate, the reflective layer comprising reflective microstructures of about 0.5 μm to about 500 μm in size and arranged in a first pattern to reflect light at a first spatial frequency; and
a refractive layer on the substrate, the refractive layer comprising refractive microstructures of about 0.5 μm to about 500 μm in size and arranged in a second pattern that is different from the first pattern to refract light at a second spatial frequency that is different than the first spatial frequency;
wherein the projection screen has a front and a back and wherein the reflective layer and the refractive layer are arranged on the substrate such that light that is projected to the front of the projection screen passes through and is refracted by the refractive layer to impinge on the reflective layer and is reflected from the reflective layer back through the refractive layer to emerge from the front of the projection screen; and
wherein the projection screen has a vertical axis and a horizontal axis and wherein the first pattern comprises a plurality of grooves that extend along the vertical axis and wherein the refractive microstructures comprise a plurality of anamorphic microlenses having a vertical half angle that is less than a horizontal half angle thereof.

10. A projection screen according to claim 9 wherein the substrate includes first and second opposing faces, wherein the anamorphic microlenses are on the first face and wherein the plurality of grooves are between the refractive layer and the first face.

11. A projection screen according to claim 9 wherein the reflective microstructures are between about 1 μm and about 100 μm in size and wherein the refractive microstructures are between about 1 μm and about 100 μm in size.

12. A projection screen according to claim 9 wherein the first and second patterns are randomly and/or regularly arranged.

13. A projection screen according to claim 9 wherein the refractive layer is a first refractive layer and wherein the projection screen further comprises a second refractive layer on the substrate, the second refractive layer comprising refractive microstructures of about 0.5 μm to about 500 μm in size arranged in the first pattern, and wherein the reflective layer extends conformally on the second refractive layer.

14. A projection screen according to claim 13 wherein the substrate includes first and second opposing faces, wherein the first refractive layer is on the first face, wherein the second refractive layer is on the second face and wherein the reflective layer is on the second refractive layer opposite the second face.

15. A projection screen comprising:
a substrate;
a reflective layer on the substrate, the reflective layer comprising reflective microstructures of about 0.5 μm to about 500 μm in size and arranged in a first pattern to reflect light at a first spatial frequency; and
a refractive layer on the substrate, the refractive layer comprising refractive microstructures of about 0.5 μm to about 500 μm in size and arranged in a second pattern that is different from the first pattern to refract light at a second spatial frequency that is different than the first spatial frequency;
wherein the projection screen has a front and a back and wherein the reflective layer and the refractive layer are arranged on the substrate such that light that is projected to the front of the projection screen passes through and is refracted by the refractive layer to impinge on the reflective layer and is reflected from the reflective layer back through the refractive layer to emerge from the front of the projection screen; and
wherein the projection screen has a vertical axis and a horizontal axis and wherein the first pattern comprises a plurality of anamorphic reflectors having a vertical half angle that is less than a horizontal half angle thereof and wherein the refractive microstructures comprise a plurality of anamorphic microlenses having a vertical half angle that is less than a horizontal half angle thereof.

16. A projection screen according to claim 15 wherein the substrate includes first and second opposing faces, wherein the plurality of anamorphic microlenses are on the first face and wherein the plurality of anamorphic reflectors are on the second face.

17. A projection screen according to claim 15 wherein the reflective microstructures are between about 1 μm and about 100 μm in size and wherein the refractive microstructures are between about 1 μm and about 100 μm in size.

18. A projection screen according to claim 15 wherein the first and second patterns are randomly and/or regularly arranged.

19. A projection screen according to claim 15 wherein the refractive layer is a first refractive layer and wherein the projection screen further comprises a second refractive layer on the substrate, the second refractive layer comprising refractive microstructures of about 0.5 μm to about 500 μm in size arranged in the first pattern, and wherein the reflective layer extends conformally on the second refractive layer.

20. A projection screen according to claim 19 wherein the substrate includes first and second opposing faces, wherein the first refractive layer is on the first face, wherein the second refractive layer is on the second face and wherein the reflective layer is on the second refractive layer opposite the second face.

21. A projection screen comprising:
a substrate including a reflective metal face having a textured surface to provide reflective microstructures of about 0.5 µm to about 500 µm in size and arranged in a first pattern to reflect light at a first spatial frequency; and
an array of refractive microstructures of about 0.5 µm to about 500 µm in size on the textured surface and arranged in a second pattern that is different from the first pattern to refract light at a second spatial frequency that is different than the first spatial frequency;
wherein the projection screen has a vertical axis and a horizontal axis and wherein the first pattern comprises a plurality of grooves that extend along the vertical axis and wherein the refractive microstructures comprise a plurality of anamorphic microlenses having a vertical half angle that is less than a horizontal half angle thereof.

22. A projection screen according to claim 21 wherein the reflective microstructures are between about 1 µm and about 100 µm in size and wherein the refractive microstructures are between about 1 µm and about 100 µm in size.

23. A projection screen according to claim 21 wherein the first and second patterns are randomly and/or regularly arranged.

24. A projection screen comprising:
a transparent substrate having front and back faces;
a first array of refractive microstructures of about 0.5 µm to about 500 µm in size on the front face, and arranged in a first pattern to refract light at a first spatial frequency;
a second array of refractive microstructures of about 0.5 µm to about 500 µm in size on the back face, and arranged in a second pattern that is different from the first pattern to refract light at a second spatial frequency that is different than the first spatial frequency; and
a reflective layer that extends conformally on the second array of micro structures to provide an array of reflective microstructures of about 0.5 µm to about 500 µm in size on the back face, and arranged in the second pattern to reflect light at the second spatial frequency;
wherein the projection screen has a vertical axis and a horizontal axis and wherein the first and second arrays of refractive microstructures comprise respective first and second arrays of anamorphic microlenses having vertical half angles that are less than horizontal half angles thereof.

25. A projection screen according to claim 24 wherein the reflective microstructures are between about 1 µm and about 100 µm in size and wherein the refractive microstructures are between about 1 µm and about 100 µm in size.

26. A projection screen according to claim 24 wherein the first and second patterns are randomly and/or regularly arranged.

* * * * *